United States Patent [15] 3,697,685
Lunn [45] Oct. 10, 1972

[54] SYNCHRONOUS AM DETECTOR

[72] Inventor: Gerald K. Lunn, Scottsdale, Ariz.
[73] Assignee: Motorola, Inc., Franklin Park, Ill.

[22] Filed: April 13, 1970
[21] Appl. No.: 27,668

[52] U.S. Cl..............178/7.3 R, 178/5.4 SD, 329/50, 329/101, 325/444
[51] Int. Cl.............................H04n 5/44, H03d 1/22
[58] Field of Search...178/5.8 R, 5.8 A, 7.3 R, 7.5 R, 178/5.4 SD; 329/50, 101; 325/444

[56] References Cited

UNITED STATES PATENTS

| | | | |
|---|---|---|---|
| 2,861,180 | 11/1958 | Sonnenfeldt | 178/7.3 R |
| 2,967,237 | 1/1961 | Schaefer et al. | 178/5.4 SD |
| 3,009,111 | 11/1961 | Rhodes | 329/50 |

OTHER PUBLICATIONS

IEEE Transactions, Broadcast & T.V. Receivers, Vol. BTR- 12, pp. 54- 60, Nov. 1966.

*Primary Examiner*—Robert L. Richardson
*Attorney*—Mueller, Aichele & Rauner

[57] ABSTRACT

A combined final IF amplifier and detector stage for a television receiver includes an integrated circuit having first and second transistor differential amplifier detector stages, the common-connected emitters of each stage of which are coupled with the collector of a different one of the transistors of a third differential amplifier stage to which the input signals are supplied. Switching of the first and second differential amplifier stages at the video carrier frequency is effected under control of a fourth differential amplifier which is driven into limiting by the input signal. To prevent intermodulation between the chroma and sound subcarrier sidebands from producing an objectionable beat signal in the output of the first and second differential amplifiers, a frequency selective circuit is connected across the outputs of the fourth differential amplifier. This frequency selective circuit peaks at the video carrier frequency and includes a notch at the chroma subcarrier frequency.

10 Claims, 1 Drawing Figure

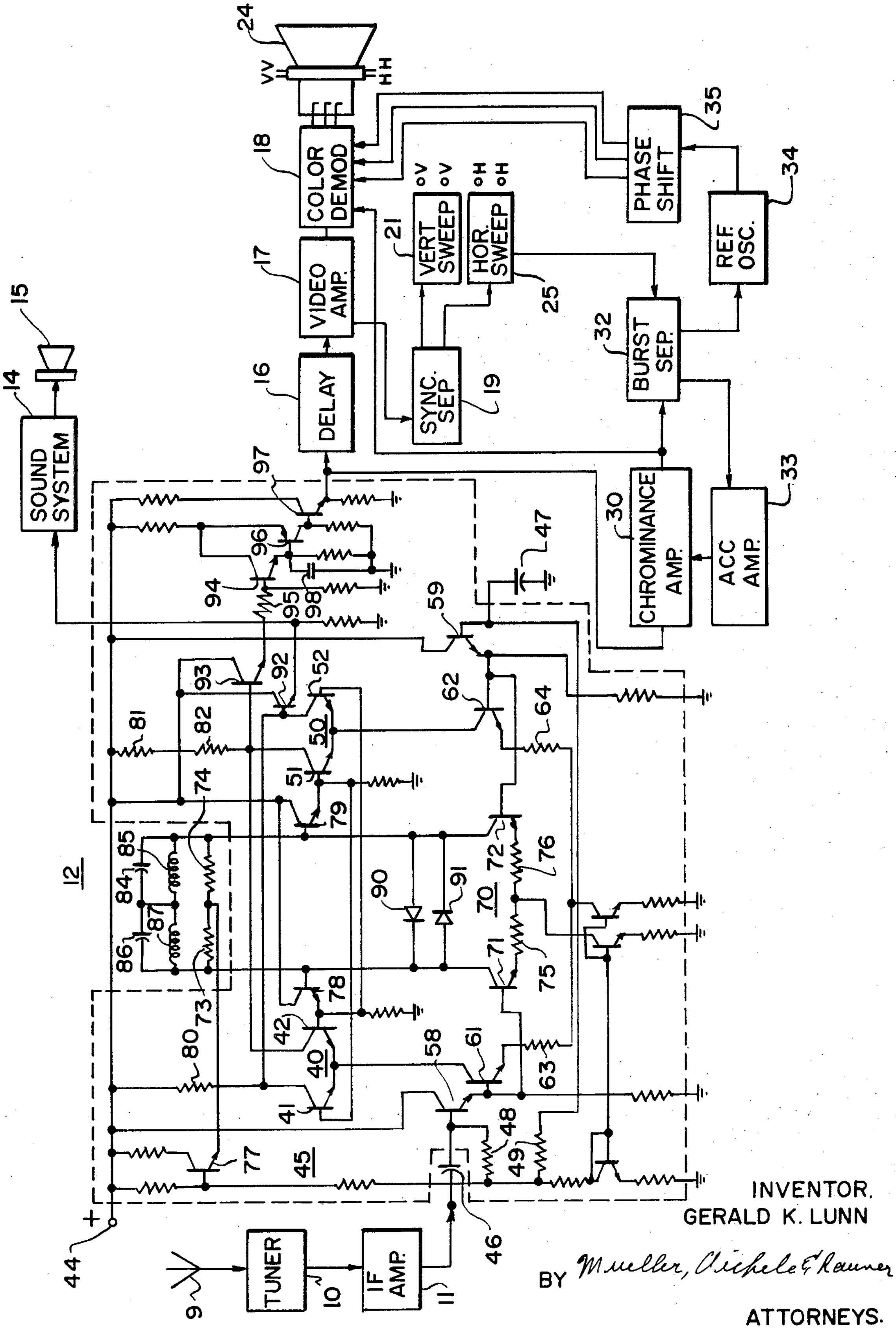
INVENTOR.
GERALD K. LUNN
BY Mueller, Aichele & Rauner
ATTORNEYS.

SYNCHRONOUS AM DETECTOR

BACKGROUND OF THE INVENTION

Television receivers operating on the NTSC system use a video IF carrier frequency of 45.75 MHz; and since the video information is in an amplitude modulated form, a simple diode generally is used for detection of the modulation. Although such a diode detector appears to be the simplest and most convenient form of circuit to use for the detection, a manner of factors complicate the design of the final IF stage and the detector.

One of the problems encountered is that the depth of modulation is nearly 100 percent for much of the time; so that in order to maintain the necessary linearity in a simple detector, a large IF output voltage is required to produce a 2 to 4 volts peak-to-peak detector output with a reserve capability of over double this amount. In addition, the bandwidth which is required from the detector is over 4 MHz, which necessitates the use of a low value load resistor (about 3,000 ohms) for the diode.

A single diode detector circuit also inherently has a low efficiency and the single-sideband high-frequency modulating components (that is, those modulating components above 0.5 MHz) provide unwanted intermodulation products in the detected output.

In the NTSC color television signal, the video carrier is at 45.75 MHz with a color subcarrier at 42.17 MHz and a sound subcarrier at 41.25 MHz. The sidebands of the color subcarrier and the sound subcarrier produce a beat (the chroma-sound beat) at 920 kHz which is highly visible on the cathode ray tube screen of the television receiver. In conventional television receivers, this problem is overcome or reduced by attenuating the amplitude of the sound carrier at the video detector with a trap or notch filter and employing a separate detector for the sound carrier, which is taken from the IF stages before the trap providing the signals to the video detector.

Because the IF stage driving the diode detector must provide a power output of up to 50 milliwatts, the device often must run at 15 milliamps quiescent current and swing 20 milliamps peak-to-peak and 30 volts peak-to-peak over the 4 MHz bandwidth, large circulating currents in the circuit are produced with consequent difficulties in decoupling, shielding, etc. Since the diode detector commonly employed is unbalanced, it also produces large currents at the fundamental IF frequency and all harmonics which are radiated and fed into the local ground plane, producing severe grounding and shielding problems in the television receiver. In addition, since the input impedance of the detector is low and varies with current swing in the device, matching of the detector with the previous stage is rendered difficult.

Low level synchronous AM detectors have been proposed in which the envelope of an amplitude modulated signal is recovered by means of multiplication of the modulated signal with the reference carrier derived from the modulated signal by a high gain limiter circuit. This type of detector has been used successfully at low IF frequencies (such as 465 kHz) but because of its complexity has not been utilized at the high IF frequencies (45.75 MHz) utilized in a television receiver. One reason is that for maximum efficiency the phase shift of the limiter branch of the circuit must be 0° or 180°, while at 90° the output must be zero. The difficulty in using such a detector at high frequency is that the multiplier and limiter inevitably introduce phase shifts which are difficult to control.

SUMMARY OF THE INVENTION

Accordingly, it is an object of this invention to provide an improved AM detection circuit.

It is an additional object of this invention to utilize a fully balanced synchronous detector for detecting amplitude modulation of a carrier signal, utilizing a multiplier circuit supplied with the modulated carrier signal and with the carrier signal as obtained from the output of a frequency selective limiter circuit also supplied with the modulated carrier signal.

In accordance with a preferred embodiment of this invention, a detector circuit for detecting amplitude modulation of a carrier frequency input signal includes a multiplier circuit with two inputs and with the modulated input signal applied to one input thereof. The modulated input signal also is applied to a limiter circuit, which is driven into limiting to provide an output signal at the carrier frequency free of the amplitude modulation. This output signal is coupled to a frequency selective filter tuned to the carrier frequency and is coupled to the other input of the multiplier circuit to operate the multiplier circuit at the carrier frequency to provide the detected output signal therefrom.

In a more specific form, the detector circuit includes first and second transistor differential amplifier circuits provided with input signals on the common-coupled emitters thereof from the outputs of a third differential amplifier circuit driven by the amplitude modulated input signal. Switching of the first and second differential amplifier circuits is controlled by a fourth differential amplifier which is driven into limiting by the input signals, with the outputs of the fourth differential amplifier being applied to a filter circuit tuned to the carrier frequency for eliminating or attenuating unwanted signal components from the switching signal.

BRIEF DESCRIPTION OF THE DRAWING

The sole FIGURE of the drawing is a circuit diagram, partially in block form, of a preferred embodiment of the invention.

DETAILED DESCRIPTION

Referring now to the drawing, there is shown a color television receiver including an antenna 9 supplying input signals to a tuner 10, which receives and converts the incoming television signals to an intermediate frequency signal. The tuner 10 may include, for example, RF stages of the receiver as well as the first detector or mixer and an associated local oscillator. The output intermediate frequency signal developed by the tuner 10 is coupled through a first intermediate frequency amplifier stage or stages 11 to a final intermediate frequency amplifier/detector stage 12, the details of which will be explained subsequently.

An output of the amplifier/detector stage 12 is applied to a sound system 14, which in turn supplies amplified audio signals to a loud speaker 15. A further output of the amplifier/detector stage 12 is applied to a delay circuit 16, which delays the brightness and synchronizing components in the detected composite video signal from the circuit 12, for purposes well known to those skilled in the art, with these delayed signals being applied to a video amplifier 17, the output of which is supplied to a color demodulator circuit 18.

The composite signal provided by the video amplifier 17 contains video information components, with a blanking interval recurring at the horizontal rate of 15,734 Hz. A horizontal synchronizing pulse appears at the beginning of each blanking interval, immediately followed by a burst signal component. Vertical synchronizing pulses also appear in the composite video signal at a 60 Hz rate and are separated from the composite signal in a synchronizing pulse separator circuit 19. The separated vertical synchronizing pulses then are applied to a vertical sweep system 21 which develops a vertical sawtooth sweep in the vertical deflection winding V—V placed on the neck of the cathode ray tube 24 for vertically deflecting the electron beams therein.

The horizontal synchronizing pulses also are separated from the remainder of the composite signal in the pulse separator circuit 19 and are supplied to a horizontal sweep system 25 which develops the horizontal sweep signal in horizontal deflection windings H—H placed on the neck of the cathode ray tube 24 for horizontally deflecting the electron beams in the cathode ray tube.

The composite signal obtained from the video amplifier/detector circuit 12 also is supplied to a chrominance amplifier circuit 30 which includes a bandpass filter having a pass characteristic for selectively passing only the chrominance subcarrier components of the detected composite signal, these chrominance components comprising the color subcarrier and its side bands and the burst signal component. The output of the amplifier 30 also is supplied to the color demodulator circuit 18 and to a burst separator circuit 32. Operation of the burst separator circuit 32, which may be a suitable gate circuit, is controlled by gating pulses obtained from the horizontal sweep system 25, which causes the burst separator gate to pass signals only during the recurring time intervals occupied by the color synchronizing burst components.

The burst components obtained from the burst separator circuit 32 are used to phase-lock or synchronize a color reference oscillator 34, the output of which is supplied to a phase-shift circuit 35 to produce the three phases of color reference signal to the color demodulator circuit 18 for demodulating the red, blue, and green color signal components applied to the cathodes of the three electron guns of the three-beam color cathode ray tube 24. The synchronous color demodulator 18 may be of the type which directly produces the three color signals needed to drive the cathodes of the cathode ray tube 24.

The output of the burst separator circuit 32 also is supplied to an automatic chroma control (ACC) amplifier circuit 33 which develops a DC control voltage proportional to the amplitude of the burst signal component obtained from the burst separator circuit 32. This control voltage then may be utilized to control the gain of the chrominance amplifier 30.

In order to provide for improved detection of the single sideband video signal with substantial cancellation of the products of the chroma subcarrier and sound subcarrier sidebands which produce the chroma-sound beat of 920 kHz, the final IF amplifier/detector stage 12 has been provided. The circuit 12, with the exception of the reactive components shown, preferably is formed as an integrated circuit on a single chip and is in the form of a fully balanced multiplier type of low level detector.

This circuit includes first and second differential switching amplifiers 40 and 50, including NPN transistors 41, 42, 51 and 52 and operated as a doubly balanced synchronous detector. Input signals for the amplifiers 40 and 50 are obtained from an input differential amplifier, including a pair of transistors 61 and 62, with the collector of the transistor 61 being connected to the emitters of the transistors 41 and 42 and the collector of the transistor 62 being connected to the emitters of the transistors 51 and 52 for supplying respective input signals to the synchronous detector differential amplifier switching circuits 40 and 50.

DC operating and bias potentials for the differential amplifiers 40, 50 and 61–62 are provided from a source of positive potential coupled to a terminal 44, with the bias potentials being obtained from a voltage divider 45 formed as part of the integrated circuit chip. The manner in which the various potentials are obtained from the voltage divider 45 is well-known in the art.

Input signals applied from the output of the first IF amplifier stages 11 are applied through a coupling capacitor 46 to the base of an emitter follower transistor 58 which drives the base of the transistor 61. The base of the transistor 62 similarly is coupled to an emitter follower transistor 59 which is by-passed for AC signals with a by-pass capacitor 47. By properly selecting the DC voltage applied to the bases of the emitter follower transistors 58 and 59, respectively, through resistors 48 and 49 connected to the voltage divider 45, opposite phases of the input signal applied through the coupling capacitor 46 are caused to appear as amplified output signals on the collectors of the differential transistors 61 and 62, the emitters of which are coupled to a constant current source through a pair of degeneration resistors 63 and 64, respectively. These amplified signals then are applied respectively to the emitters of the differential amplifier switches 40 and 50.

In order to operate the differential amplifier switches 40 and 50 in synchronism with the signals applied to the emitters of the transistors 41, 42, 51 and 52, the signals present on the emitters of the emitter follower transistors 58 and 59 also are utilized to drive a pair of transistors 71 and 72 forming a fourth differential amplifier 70, with the emitters of the transistors 71 and 72 being connected through a pair of resistors 75 and 76, respectively, to a separate constant current source from the constant current source used to provide current for the differential amplifier 61–62. The resistors 75 and 76 linearize the input impedance of the differential amplifier 70 and minimize interaction between the amplifiers 70 and 61, 62. The transistors 71 and 72 amplify the signals applied to their bases, with the amplified signals on the collectors appearing across a pair of load resistors 73 and 74, respectively;

and the junction of the resistors is supplied with a positive DC potential from the emitter of a regulator transistor 77, the base of which is connected to the voltage divider 45.

The transistors 71 and 72 are driven into limiting by the modulated carrier, so that they are alternately driven between saturation and cut-off to provide alternating switching signals on the collectors thereof at the carrier frequency. The gain of the transistors 71 and 72 is sufficient to provide a signal of sufficient strength to switch the transistors 41, 42, 51 and 52 as required for operation of the differential amplifier switches 40 and 50 as synchronous detectors, but since only one stage of gain is employed in the production of this switching signal, the high frequency phase shift is small enough that it is of substantially no consequence in the operation of the circuit. In addition since the transistors 61, 71 and 62, 72, are supplied with the same input signals, there is substantially no relative phase shift between the outputs of the amplifiers 70 and 61, 62. In order to provide a buffer for the amplified switching signals produced by the transistors 71 and 72, a pair of NPN emitter followers 78 and 79 are driven by the transistors 71 and 72, respectively, with the emitter follower 78 being coupled to the bases of the transistors 42 and 52 and the emitter follower 79 being coupled to the bases of the transistors 41 and 51, to provide alternate switching of the two transistors in each of the differential amplifier detector switches 40 and 50.

The construction of the limiter amplifier portion of the circuit including the transistors 71, 72, 78 and 79 causes the bias on the detector switching transistors 41, 42, 51 and 52 to be automatically established through the emitter followers 78 and 79 at a predetermined level below the positive potential applied to the terminal 44, this level being established by the bias chain 45 and the regulator transistor 75. Under quiescent conditions of operation, the currents in the transistors 71 and 72, and therefore in the load resistors 73 and 74, are equal. Thus, if the resistors 73 and 74 are well matched, as they should be on the integrated circuit chip, the base voltages of the emitter followers 78 and 79 also are well matched; so that the detector switching transistors 41, 42, 51 and 52 produce a well-balanced quiescent output signal.

Since the bases of the transistors 61, 62, 71 and 72 are driven from the emitters of the transistors 58 and 59, the transistors 61, 62, 71 and 72 are buffered from the input signals applied through the coupling capacitor 46. This causes the input impedance of the circuit to be considerably higher than if the bases of the transistors 61, 62, 71 and 72 were connected directly to the input as obtained from coupling capacitor 46. The high input impedance makes it possible to reduce the value of the decoupling capacitor 47 sufficiently for television IF frequencies to make it practical to form it on the monolithic chip. At lower IF frequencies, the capacitor 47 must be external. The resistors 63, 64, 75 and 76 further provide degeneration in the emitters of the transistors 61, 62, 71 and 72 to produce good signal linearity.

The detected output of one phase then is obtained across a load resistor 80 coupled in common to the collectors of the transistors 41 and 52, with the detected output signal of the opposite phase being obtained across a pair of resistors 81 and 82, forming the load resistor to which the collectors of the transistors 42 and 51 are connected in common. The first detected output appearing across the load resistor 80 is applied through an NPN emitter follower transistor 92 as the input to the sound system 14. Similarly, the detected output appearing across the resistors 81 and 82 is applied to the base of an NPN emitter follower transistor 93 which is used to provide the detected video output from the combined final IF detector stage 12.

In the circuit described thus far, the switching signal appearing on the collectors of the transistors 71 and 72 ideally should be only the carrier frequency of the video signal, but in practice this switching signal is the carrier frequency of the video signal plus sidebands which operate on the signal itself. As a consequence, in the circuit described thus far, as in a standard single diode detector circuit, detection products are produced not only between the carrier and the sidebands which are the wanted signals but between the sidebands themselves. As stated previously, two particular sidebands are troublesome in this respect for a color television receiver, these being the chroma and sound subcarrier sidebands which interact to produce the 920 kHz beat frequency which appears within the video bandwidth and cannot be suppressed.

In order to eliminate or substantially attenuate the sidebands in the switching signal at the collectors of the transistors 71 and 72, a parallel resonant tuned circuit, including a capacitor 84 and an inductor 85 is placed across the collectors of the transistors 71 and 72, and this circuit is resonant at the frequency of the video carrier. Since the signal channels, obtained from the collectors of the transistors 61 and 62, and the reference switching channels, obtained from the collectors of the transistors 71 and 72, are separate, it is possible to operate on the frequency response of the switching channels or paths in this manner without affecting the frequency response of the main signal channels.

The operation of the parallel tuned circuit 84, 85, tuned to the video carrier frequency, causes the amount of the chroma subcarrier component in the switching signal to be reduced compared with the video carrier. As a consequence, the amount of the unwanted chroma-sound beat also is reduced; but at the same time, the desired detection of the chroma and sound subcarriers in the detector amplifiers 40 and 50 by the video carrier is unaffected since the signal channels are not affected by the tuned circuit 84, 85. In addition the tuned circuit causes the bases of the transistors 78 and 79 to be at the same voltage without matching of the resistors 73 and 74. Employing the single parallel tuned circuit 84, 85 of the sole tuned circuit across the collectors of the transistors 71 and 72, however, renders a significant reduction in the chroma/sound beat difficult to obtain unless a high-Q tuned circuit is employed. This, however, renders tuning of the television receiver difficult. In order to avoid the necessity for this high-Q circuit, the filter circuit connected across the collectors of the transistors 71 and 72 is additionally provided with a capacitor 86 coupled between the collector of the transistor 71 and the junction of the capacitor 84 with the inductor 85. This capacitor 86 is adjusted in value to provide a series-tuned circuit with a notch at the frequency of the chroma subcarrier, and the composite filter circuit consisting of the capacitors 84 and 86 and the inductor 85 has been found to provide at least 30 db reduction in the chroma-sound beat. As a result, a significant relaxation in the requirements for the sound carrier trap in the video amplifier path of the receiver is possible.

In order to provide a Dc path across the filter network, an additional inductor 87 is coupled across the capacitor 86 and has a value (of the order of 10 uH) selected to provide for DC continuity to equalize the DC base voltages on the emitter follower transistors 78 and 79, thereby providing better control of the balance in the differential amplifier detector switches 40 and 50. The inductor 87, however, is not part of either of the tuned circuits provided by the capacitors 84 and 86 and the inductor 85.

A pair of hot-carrier diodes 90 and 91 are poled in opposite directions and connected across the collectors of the transistors 71 and 72. The diodes 90 and 91 limit the voltage swing on these collectors to about 350 mV peak to peak. If large swings were permitted on these collectors, there would be some coupling into the emitters of the detector differential amplifiers 40 and 50 by way of the non-linear base-emitter-capacitance of the transistors 41, 42, 51 and 52 when they are "off" injecting a non-linearity into the detected signal. The diodes 90, 91 are hot-carrier types, which are relatively easy to make on a monolithic device, because ordinary diodes have sufficient non-linear diffusion capacitance and storage effects to cause an amplitude-dependent phase shift which badly distorts the detected waveform. The hot-carrier diodes eliminate the distortion due to capacitive coupling into the detector emitters and do not introduce any other distortion.

Because of the detector bandwidth and the relaxed requirements on the 41.25 MHz trapping circuitry due to the characteristics of the circuit just described, it is possible to obtain sufficient 4.5 MHz output to directly drive an integrated circuit sound IF stage in the sound system 14. The 4.5 MHz signal may be taken directly from the detector output at the collectors of the transistors 41 and 52 by replacing the resistor 80 with a 4.5 MHz tuned circuit. Or the composite signal may be applied to the sound system 14 from the emitter of the emitter follower transistor 92, with the sound system 14 providing the 4.5 MHz tuned circuit.

The values of the load resistors 80, 81 and 82 also are chosen so that the time constant with the collector capacitances of the transistors 41, 52 and 42, 51 along with the base capacitances of the emitter follower transistors 92 and 93 starts to roll off the detector frequency response at just above the required video band-width. As a consequence, the detector is self-filtering for high frequency products of detection (mainly the even harmonics of the video carrier).

The final IF amplifier/detector circuit 12 matches readily with preceding IF stages because it has good sensitivity (30 mV rms at 45.74 MHz) with a relatively high input impedance (4 kΩ and 7pF), but the detected video output does not readily match with standard video circuits because the DC potential is about +10 volts with a video output of 2 to 4 volts peak-to-peak. To provide a larger linear swing with a lower DC potential, an additional video amplifier stage with a gain of 2 is added to the circuit and includes an NPN transistor 94, the base of which is connected through a resistor 95 to the emitter of the emitter-follower transistor 93, a lateral PNP transistor 96 and a final NPN transistor 97. Since the lateral PNP transistor 96 suffers from poor beta especially at higher currents (1 mA or so), the transistor 94 is employed, using a small amount of positive feedback to overcome the deficiencies of the transistor 96. The emitter follower transistor 97 acts as a buffer stage.

The amplifier stage including the transistors 94, 96 and 97 further includes a capacitor 98 coupled between ground and the base of the transistor 97. This stage operates as an effective low-pass filter, providing a 26 db reduction in the ripple components with respect to the video signal, with only a small amount of carrier ripple appearing on the sync tip of a 3 volts peak-to-peak video signal. The capacitor 98 peaks the frequency response slightly providing an overall bandwidth (including the detector) of DC to 8 MHz 1 db down. The output of the transistor 97 is sufficient to supply the input signals to the chrominance amplifier 30 and the delay circuit 16 of a conventional television receiver.

In conjunction with the foregoing description, it should be noted that the outputs of the emitter followers 92 and 93 could be interchanged to cause the sound system take-off to be obtained from the emitter of the emitter follower 93, with the base of the transistor 94 being coupled to the emitter of the emitter follower transistor 92, if opposite phased sound and video signals were desired for the subsequent stages of operation of the circuit. In the circuit shown in the drawing, the detected signals applied to the bases of the emitter follower transistors 92 and 93 are the same but are of opposite phase; so that these signals can be applied equally well to either the sound system or the video amplifier system. Or only a single output emitter follower could be used with the sound and video outputs being common.

The circuit which thus far has been described in a high gain IF output stage combined with an AM detector having an upper frequency limit sufficiently high to adequately handle the video frequency signals present in television receivers. The circuit can be produced in a monolithic integrated circuit form, substantially reducing its cost. In television applications, the input sensitivity is much higher than the standard final IF and detector combination normally employed, while the IF power consumption is less, the chroma sound beat is substantially reduced, and IF radiation problems are considerably reduced.

It also should be apparent that the detector circuit can be employed in an AM radio, CATV and other other applications requiring an AM detector which will work at high modulation depth with low distortion. By separating the detector switching channel and the signal channel, it is possible to modify the frequency response of the switching channel to provide rejection of undesired sideband detection products, while permitting unmodified response of the signals in the main signal channel.

I claim:

1. An integrated detector circuit for detecting amplitude modulated input signals of a predetermined frequency, including in combination:

multiplier circuit means including transistor differential amplifier switch means having a switching input, first and second outputs, and a signal input;

means for applying the modulated input signals to the signal input of the differential amplifier switch means;

limiter circuit means;

means for applying the modulated input signals to the limiter circuit means to drive the limiter circuit means to limiting to produce an output signal at said predetermined frequency without said amplitude modulation;

frequency selective filter means coupled to the limiter circuit means and tuned to said predetermined frequency for attenuating signals at frequencies other than said predetermined frequency; and the output of the limiter circuit means being coupled with the switching input of the transistor differential amplifier switch means, causing the differential amplifier switch means to alternately switch input signals applied to the signal input thereof between the first and second outputs at said predetermined frequency so that detected amplitude modulated signals appear at the outputs of the multiplier circuit means.

2. The combination according to claim 1 further including output load impedance means coupled with the outputs of the differential amplifier switch means, the value of the load impedance means selected for interaction with the inherent circuit capacitances of the differential amplifier switch means to roll-off the detector frequency response at frequencies above said predetermined frequency.

3. A wide-band fully balanced AM detector circuit for detecting the amplitude modulation of a carrier signal forming part of a composite signal having at least another signal side band subcarrier signal, the side bands of which may produce a beat signal in a frequency range which interferes with the detected signal, said detector circuit including in combination:

first, second, third and fourth transistor differential amplifiers, each including a pair of transistors having base, collector and emitter electrodes, the emitter electrodes of each pair being coupled in common;

means for coupling the collectors of the transistors of the third differential amplifier to the common coupled emitters of the first and second differential amplifiers, respectively, to form a doubly balanced synchronous detector circuit;

means for applying the composite signal to be demodulated to the bases of the transistors of the third differential amplifier;

means for applying the composite signal to the bases of the transistors of the fourth differential amplifier, with the magnitude of the input signals applied to the fourth differential amplifier being sufficient to drive the transistors thereof between saturation and cut-off to produce on the collectors thereof an amplitude limited signal at the carrier signal frequency;

means for coupling the collectors of the transistors of the fourth differential amplifier to the bases of respective ones of each of the transistors in the first and second differential amplifiers to alternately switch the transistors in the first and second differential amplifiers between conduction and nonconduction on alternate half cycles of the carrier signal; and frequency selective circuit means coupled with the collectors of the transistors of the fourth differential amplifier and tuned to the carrier frequency for reducing unwanted beat signals.

4. The combination according to claim 3 wherein the frequency selective circuit means includes first circuit means having a peak frequency response at the carrier frequency and second circuit means forming a notch at the frequency of said subcarrier signal.

5. The combination according to claim 4 wherein the first circuit of the frequency selective circuit means is a parallel resonant circuit, resonant at the carrier frequency, and the second circuit for forming the notch is a series resonant circuit, resonant at said subcarrier frequency.

6. The combination according to claim 3 wherein the composite signal includes an amplitude modulated video carrier, the amplitude modulation of which the detector circuit is designed to detect, a chroma subcarrier signal and a sound subcarrier signal, with the chroma and sound subcarrier signals having side bands which interact to produce a beat frequency which is within the video band width, with the frequency selective circuit means being tuned to the video carrier frequency to thereby attenuate the chroma and sound subcarrier signals in the switching signals applied to the bases of the transistors of the first and second differential amplifiers.

7. The combination according to claim 6 further including output load resistance means coupled with the collectors of the transistors of the first and second differential amplifiers, the value of the load resistance means being such that a roll-off filter is formed by the load resistance means and the inherent collector capacitances of the first and second differential amplifier transistors for rolling off the detector frequency response at frequencies above the bandwidth of said video carrier signal.

8. The combination according to claim 3 wherein at least said first, second, third and fourth differential amplifiers all are formed as part of a single integrated circuit thereby to substantially match the characteristics of operation of said differential amplifiers.

9. The combination according to claim 8 wherein the collectors of transistors of the first and second differential amplifiers are cross-coupled to provide an output signal indicative of the amplitude modulation of the carrier signal.

10. The combination according to claim 3 further including first and second oppositely poled hot-carrier diodes coupled in parallel across the collectors of the transistors of the fourth differential amplifier.

* * * * *